United States Patent
Quist

(10) Patent No.: US 11,719,282 B2
(45) Date of Patent: Aug. 8, 2023

(54) COOLING RING BRACKET

(71) Applicant: Siemens Gamesa Renewable Energy A/S, Brande (DK)

(72) Inventor: Tom Quist, Silkeborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 886 days.

(21) Appl. No.: 16/425,545

(22) Filed: May 29, 2019

(65) Prior Publication Data

US 2019/0376561 A1 Dec. 12, 2019

(30) Foreign Application Priority Data

Jun. 6, 2018 (EP) .................................... 18176279

(51) Int. Cl.
*F16C 33/58* (2006.01)
*F16C 43/04* (2006.01)
(Continued)

(52) U.S. Cl.
CPC ............ *F16C 43/04* (2013.01); *F16C 33/586* (2013.01); *F16C 33/64* (2013.01); *F16C 37/00* (2013.01);
(Continued)

(58) Field of Classification Search
CPC ........ F16C 43/04; F16C 33/586; F16C 33/64; F16C 2300/14; F16C 2300/54;
(Continued)

(56) References Cited

U.S. PATENT DOCUMENTS 2,733,492 A * 2/1956 Copell ...................... A24F 9/14
248/500
4,222,705 A * 9/1980 Smith ................... F16C 37/007
415/114
(Continued)

FOREIGN PATENT DOCUMENTS

CN 102713273 A 10/2012
CN 104295454 A 1/2015
(Continued)

OTHER PUBLICATIONS

Non-English Chinese Office Action for Application No. 201910491657.5, dated May 8, 2020.

Primary Examiner — Nkeisha Smith
(74) Attorney, Agent, or Firm — Schmeiser, Olsen & Watts LLP

(57) ABSTRACT

Provided is a bracket for securing a number of cooling rings arranged on a bearing ring, which bracket includes an upper surface, a lower surface shaped to lie on the cooling rings, and a through-opening extending between the upper surface and the lower surface to accommodate a fastener for mounting the bracket to the bearing ring; wherein the material properties of the bracket are chosen to permit movement of the cooling rings relative to the bracket when the bracket is mounted to the bearing ring; and/or wherein the bracket is made of a resilient elastic material. Further provided is a cooling arrangement for a bearing, including a number of cooling rings arranged in parallel on a mounting surface of a bearing ring of the bearing; and a number of such brackets to secure the cooling rings to the bearing body.

20 Claims, 4 Drawing Sheets

(51) Int. Cl.
*F16C 33/64* (2006.01)
*F16C 37/00* (2006.01)
*F16L 3/04* (2006.01)
*F16L 3/223* (2006.01)

(52) U.S. Cl.
CPC .............. *F16C 37/007* (2013.01); *F16L 3/04* (2013.01); *F16L 3/2235* (2013.01); *F16C 2226/76* (2013.01); *F16C 2300/14* (2013.01); *F16C 2300/54* (2013.01); *F16C 2360/31* (2013.01)

(58) Field of Classification Search
CPC .... F16C 37/00; F16C 37/007; F16C 2226/76; F16C 2360/31; F16C 33/58; F16L 3/04; F16L 3/2235; F02C 7/28; F02C 3/00; F01D 11/02; F01D 25/246
USPC ................ 248/309.1, 309.2, 316.1, 500, 506
See application file for complete search history.

(56) References Cited

U.S. PATENT DOCUMENTS

| | | | | |
|---|---|---|---|---|
| 8,318,069 | B2 * | 11/2012 | Liesegang | F16C 35/063 249/83 |
| 8,899,544 | B2 * | 12/2014 | Meredith, Jr. | H02G 3/263 248/500 |
| 9,303,694 | B2 * | 4/2016 | Eriksen | F16C 37/00 |
| 9,732,884 | B1 | 8/2017 | Keller | |
| 10,197,093 | B2 * | 2/2019 | Kullin | F03D 80/70 |
| 2007/0177839 | A1 * | 8/2007 | Van De Sanden | B60B 27/00 384/589 |
| 2008/0087465 | A1 * | 4/2008 | Anderson | H02G 3/30 174/72 A |
| 2011/0142386 | A1 * | 6/2011 | Flouros | F16C 33/586 384/321 |
| 2012/0280511 | A1 | 11/2012 | Eriksen | |
| 2015/0023621 | A1 | 1/2015 | Eriksen et al. | |
| 2015/0128518 | A1 * | 5/2015 | Knight | E04F 13/0864 52/404.1 |
| 2017/0009909 | A1 | 1/2017 | Robert, Jr. | |
| 2018/0003239 | A1 * | 1/2018 | McNichols | F16G 11/12 |
| 2021/0372479 | A1 * | 12/2021 | McNichols | F16G 11/12 |

FOREIGN PATENT DOCUMENTS

| | | |
|---|---|---|
| CN | 108050023 A | 5/2018 |
| DE | 1655715 U | 5/1953 |
| DE | 2651286 A1 | 5/1977 |
| DE | 102010049953 A1 | 4/2012 |
| EP | 2520797 A1 | 11/2012 |
| EP | 2827012 A1 | 1/2015 |
| JP | H0267184 U | 5/1990 |
| WO | 2018024410 A1 | 2/2018 |

* cited by examiner

COOLING RING BRACKET

CROSS-REFERENCE TO RELATED APPLICATIONS

This application claims priority to EP Application No. 18176279.0, having a filing date of Jun. 6, 2018, the entire contents of which are hereby incorporated by reference.

FIELD OF TECHNOLOGY

The following describes a cooling ring bracket, and a cooling arrangement.

BACKGROUND

Large bearings are required in various applications such as large electrical machines. A main bearing of a generator such as a multi-megawatt wind turbine generator can have a diameter of several meters. During operation, a rotating bearing ring turns relative to a stationary bearing ring, and it is generally unavoidable that heat develops during operation, so that large bearings require some kind of cooling arrangement.

One way of cooling such a large bearing is to arrange a number of hollow annular channels or "cooling rings" about the stationary bearing ring, and to transport a fluid cooling medium through these channels. A cooling circuit is completed by connecting the cooling rings by means of hoses to a pump that circulates a fluid coolant through the channels. A thermal conductive paste can be applied between the bearing surface and the cooling ring to improve heat transfer. Usually, the cooling rings are made of aluminium or a similar metal that is effective in transporting heat.

To cool the bearing effectively, the channels must be pressed against the body of the bearing so that heat from the bearing can be transferred to the cooling medium. This has usually been achieved by arranging a flat metal bracket or clamp across several parallel cooling rings, and screwing the metal bracket into the body of the bearing using a fastener. The clamping effect is achieved by tightening the fastener to a sufficient tension.

However, the effectiveness of the known bracket realization is compromised by several factors such as vibrations in the bearing; thermal expansion and contraction of the cooling rings, brackets and fasteners; ovalization of the bearing, etc. Any of these factors can cause the fastener to become loose eventually. A loosened fastener means or fastener that the cooling rings are no longer effectively pressed against the bearing surface. The usual way to address this problem is to tighten the fastener as much as possible, but this generally only has the effect of gradually forcing the thermal paste from underneath the cooling rings, and the fastener can then become loose. Another way of addressing this problem might be to use more fasteners, for example two fasteners per bracket. However, this would be associated with considerable costs since it is then necessary to machine a large number of additional threaded bushings in the bearing ring, in addition to the added material costs of the additional fasteners, washers, etc.

Another problem with the known bracket is that a cold weld can form between the opposing surfaces of the metal bracket and metal cooling ring, particularly when these are made of the same metal. Cold welds are made more likely when great force is used to tighten the fasteners. Slight back-and-forth movements (micro-movements) of a cooling ring may ensue from any of the factors listed above, but a cold weld between a cooling ring and a bracket will act to allow motion in one direction only. As a result, a cooling ring may exhibit a creeping motion in that direction. As explained above, a hose is attached at some point to a cooling ring in order to circulate the fluid coolant, but the creeping movement of the cooling ring may ultimately cause failure at the hose connection point. A cold weld is more likely to form between two objects made of the same metal, but even if the bracket is made of a metal that is different from the metal of the cooling rings to avoid the formation of cold welds, this would not solve the problem of the fasteners becoming loose.

SUMMARY

An aspect relates to provide an improved way of securing cooling rings to a bearing ring, to overcome the problems outlined above.

According to embodiments of the invention, the cooling ring bracket secures a number of cooling rings arranged in parallel on a surface of a bearing ring of a large bearing, and is shaped to extend over several cooling rings and comprises an upper surface, a lower surface shaped to lie on the cooling rings, and a through-opening extending from the upper surface to the lower surface to accommodate a fastener for mounting the bracket to the bearing ring. Generally, the upper and lower surfaces of the bracket are essentially parallel and planar. The inventive bracket is based on the insight that micro-movements of the cooling rings are unavoidable, and the material properties of the bracket are therefore chosen to permit lateral or sideways movement of the cooling rings relative to the bracket when the bracket is mounted to the bearing ring, i.e. the under surface of the bracket will exhibit a low coefficient of friction when the system is at rest (static friction) and also when the system is in motion (kinetic friction). The "system" is to be understood as the cooling rings and the brackets holding them in place, so that kinetic friction applies when a cooling ring is moving slightly relative to a bracket. The static friction $\mu_s$ between the cooling ring surface(s) and the bracket is less than 0.45, or less than 0.3, in contrast to the known art system, in which the static friction $\mu_s$ between the aluminium cooling rings and an aluminium bracket can exceed 1.5. According to embodiments of the invention, the bracket is made of an elastic and resilient material, so that the bracket will advantageously retain its shape even after being subject to compression forces exerted on it by the fastener. Such compression forces may arise when the cooling ring(s) undergo thermal expansion. The material of the inventive bracket permits some degree of compression and assumes its original shape when the cooling rings once again undergo thermal contraction.

According to embodiments of the invention, the cooling arrangement is realized to cool a large bearing of the type described in the introduction, and comprises a number of cooling rings arranged in parallel on a mounting surface of a bearing ring of the bearing and a number of such brackets, wherein a bracket is arranged to span the cooling rings and is secured to the bearing ring by a fastener, a single fastener, extending from the upper surface of the bracket through the through-opening and into the bearing body.

An advantage of the inventive cooling arrangement is that slight movements of the cooling rings relative to the bracket are not prevented but instead, these micro-movements are deliberately allowed. Instead of clamping a bracket onto cooling rings with great force to lock the cooling rings in place, the inventive bracket is designed to permit the cooling rings to move slightly during operation of the bearing. As a result, the cooling rings can move if required during operation of the bearing, and can return to their original position. The likelihood of damage to any hoses of a cooling circuit will therefore be reduced or even eliminated. Another advantage of the inventive cooling arrangement is that the bracket retains its shape even after being subject to compression forces exerted on it by the fastener. Therefore, the effectiveness of the bracket will not be compromised by factors such as vibrations in the bearing, thermal expansion of the cooling rings, ovalization of the bearing, etc.

A cold weld will not develop between a cooling ring and the bracket when the material properties of the bracket are chosen to exhibit low kinetic friction when the cooling ring moves relative to the bracket.

Thermal expansion of the cooling rings will result in a slight compression of the bracket body instead of loosening the fastener. Owing to the resilience of the bracket material, the bracket will assume its original shape following thermal contraction of the cooling rings. The bracket fasteners of the inventive cooling arrangement are therefore considerably less likely to become loose during operation of the bearing.

Particularly advantageous embodiments and features of the invention are given by the dependent claims, as revealed in the following description. Features of different claim categories may be combined as appropriate to give further embodiments not described herein.

The inventive bracket can be used to attach cooling rings to any kind of large bearing. In the following, without restricting embodiments of the invention in any way, it may be assumed that the bearing is a main bearing of an electrical machine such as a generator of a wind turbine. It may also be assumed that the outer bearing ring rotates relative to the inner stationary bearing ring, and that several cooling rings or cooling rings are arranged in parallel on an inner surface of the stationary bearing ring.

Because it is generally exemplary to avoid expensive and time-consuming modifications to a bearing in order to attach other components, the cooling rings are generally shaped to lie on the unaltered bearing surface. Therefore, in the following, a cooling ring may be assumed to be a hollow metal conduit with a rectangular cross-section, although other forms are possible. A cooling ring can have a height of 15-30 mm, and a width in the order of 30 mm. The cooling arrangement may be realized to circulate a suitable coolant such as a mixture of ethylene glycol and water through the cooling rings. For a large main bearing, one or more groups of three or more parallel cooling rings may be used to cool the bearing. The interior dimensions of a cooling ring are generally chosen to achieve a satisfactory pressure and flow rate of the cooling fluid. The inventive bracket may also be referred to in the following as a cooling ring bracket, since it serves to hold the cooling rings in place on the bearing.

A main bearing of a wind turbine generator can be realized as a roller bearing. According to embodiments of the invention, the main bearing of a wind turbine generator comprises a rotating outer bearing ring and a stationary inner bearing ring, and an embodiment of the inventive cooling arrangement installed on an inner annular surface of the stationary bearing ring.

The cooling ring bracket can be made of any suitable material, i.e. any material that exhibits the desired properties of elasticity and resilience. In a particularly exemplary embodiment of the invention, a bracket is made of polyoxymethylene (POM), POM copolymer (POM-C), since this material exhibits a favourably high degree of elasticity and a favourably high degree of resilience. This material exhibits a very low coefficient of friction against the surface of a metal (e.g. aluminium) cooling ring.

Furthermore, polyoxymethylene is a relatively cheap material, and a polyoxymethylene bracket can be manufactured very economically in an injection moulding process.

The bracket is formed so that, when the bracket is being mounted to the bearing ring, a fastener inserted into the through-opening will extend through a gap between adjacent cooling rings. The body of the bracket is shaped to span at least three cooling rings mounted in parallel on a bearing ring.

To effectively clamp the cooling rings against the surface of the bearing ring, the clamping force exerted by the fastener (when screwed into the bearing ring) is distributed over the cooling rings. To this end, in a particularly exemplary embodiment of the invention, the bracket is shaped such that, when mounted in place over the cooling rings, the height of its upper surface (and therefore also the fastener flange) exceeds the height of a cooling ring by at least 200%, more at least 250%, and may even exceed the height of a cooling ring by 300% or more. The added height advantageously acts to better distribute the clamping force over the cooling rings. The through-opening in the bracket is formed to accommodate a fastener comprising a long shank or grip length. The shank is the portion of the fastener between its threaded end and the nut end. A standard fastener can be chosen to have a shank length that is at least as long as the height of the bracket, so that the threaded portion of the fastener does not extend into the through-opening of the bracket. For example, for cooling rings with a height of 15 mm, and a bracket with a height (i.e. through-hole length) of 30 mm, the fastener shank length is at least 30 mm and up to 45 mm. The length of the threaded portion is at least as long as the depth of the threaded bushing machined in the bearing ring.

The bracket and through-opening are formed so that the head of the fastener lies against the upper surface of the bracket. The fastener may have a conventional hexagonal head, for example. When the fastener is screwed into the bearing ring so that the fastener head presses onto the bracket, the resulting clamping force will be distributed through the bracket body onto the cooling rings. The clamping force generated when the inventive bracket is mounted onto the cooling rings can be in the order of 4000 N. Due to the shape and material properties of the inventive bracket, at least 15% of this clamping force will be transferred to the outermost cooling ring, and this clamping force will be maintained, since the fastener will not become loose. In contrast, the shape and material properties of a known art bracket result in loosening of the fastener so that eventually there may be a complete absence of clamping force acting on the cooling rings.

The fastener is a metal screw comprising a flanged head to more effectively transfer the clamping force into the bracket. The flange comprises a ridged or other surface texture so that the flange acts as a lock washer to engage with the material of the bracket. An advantage of the inventive bracket is that it can be secured to the bearing ring using only a single fastener, without the need for any additional washers, lock washers, spacers, etc.

A known bracket could be secured to the bearing ring using a fastener with a long shaft, but this would require the use of a spacer to achieve the desired height above the cooling rings, as well as several washers. While the use of a spacer with the known flat bracket can improve the distribution of the clamping force over the cooling rings, it does not solve the problem of cold welds developing between the bracket and cooling ring, and may even exacerbate this problem and the attendant likelihood of damage to a cooling hose. It also does not solve the problem of fasteners eventually becoming loose, so that the fasteners must be re-tightened at regular intervals. Therefore, this approach is not satisfactory on account of the significant costs associated with the additional parts, together with the costs associated with maintenance procedures.

The under surface of the bracket can be flat and uniform, apart from the lower aperture of the through-opening. However, in an exemplary embodiment of the invention, the bracket is formed to comprise a nose arranged to extend into a gap between adjacent cooling rings. The bracket may also be formed to comprise another nose shaped to extend over an outer edge of an outer cooling ring. A nose is formed as a ridge that extends over the depth of the bracket, so that the nose fills the gap between adjacent cooling rings, for example. Such a nose can also act as a spacer during the assembly process when mounting the cooling rings onto the main bearing. In the case of three or more parallel cooling rings, the fastener will extend between two adjacent cooling rings, and the nose(s) can contribute to an optimal distribution of the clamping forces onto the cooling rings.

As mentioned above, a main bearing can become hot during operation, and it is necessary to monitor the temperature. Also, vibrations can develop during operation of the machine that incorporates the bearing. Vibrations should also be monitored to detect any anomaly. Temperature and/or vibrations can be measured using various types of sensor. These need to be arranged close to the source of heat/vibration. In an exemplary embodiment of the invention, therefore, the bracket is formed to comprise an attachment means or attachment realized to facilitate attachment of a sensor cable to the bracket. The attachment means or attachment can be an integral eyelet or short spar to which a cable tie can be attached, for example.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
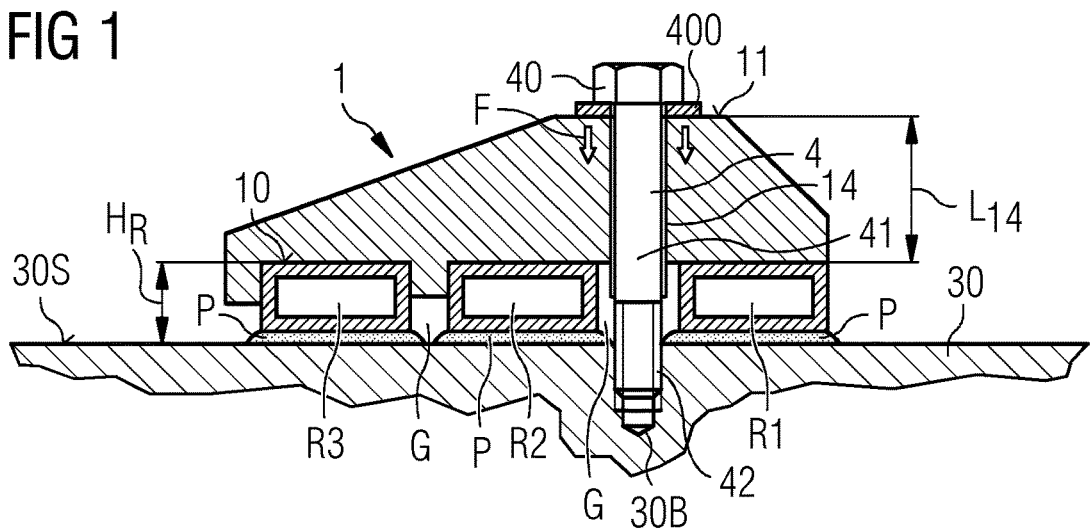
FIG. 1 shows an embodiment of the inventive bracket.

FIG. 1 shows an embodiment of the inventive bracket 1. The bracket 1 is formed in one piece, for example, by injection molding, and is realized to extend across three parallel cooling rings R1, R2, R3. The body of the bracket 1 is roughly in the shape of an acute trapezoid, and its highest point is positioned over a gap G between two adjacent cooling rings R1, R2. The bracket 1 essentially extends from a base level 10 to an upper level 11, and its shape is defined by an inclined side face extending from the base level 10 to the upper level 11. The bracket is made of a material that is highly resilient and which also exhibits a favourable degree of elasticity and resilience so that it assumes its original shape after being subject to compression. A suitable choice of material may be a high performance engineering polymer such as polyoxymethylene (POM-C) on account of its strength, elastic modulus, and longevity. The static friction $\mu_s$ between the surface of an aluminium cooling ring R1, R2, R3 and a POM-C bracket 1 can be very low, e.g. lower than 0.3, so that the bracket 1 will not inhibit a micro-movement of the cooling ring R1, R2, R3 during operation of the bearing.

In this embodiment, a through-opening 14 extends through the bracket 1 from the upper level 11 to the base level 10, so that a fastener 4 can be screwed into a threaded bushing 30B in the bearing ring 30. Here, the fastener 4 is a metal screw with a head 40 and an integrally formed flange 400, so that the flange 400 lies against the upper surface 11 of the bracket 1. When the fastener 4 is tightened, a clamping force F is transferred via the flange 400 through the body of the bracket 1 and onto the cooling rings R1, R2, R3, specifically also onto the outermost cooling ring R3, even though this is offset laterally from the fastener 4. In this exemplary embodiment using a bracket 1 made of POM-C, the torque applied when tightening the fastener should not exceed 25 Nm, which is large enough to achieve the desired clamping force onto the cooling rings. The favourably uniform transfer of force F is made possible by the specific shape of the cooling ring bracket 1 and also by its properties of elasticity and resilience. A serrated flange surface ensures that the flange 400 engages with the material of the bracket 1 in the manner of a lock washer.

The diagram also indicates a layer of thermal paste P between the bearing ring 30 and the cooling rings R1, R2, R3. The purpose of the paste P is to facilitate the transfer of heat between the bearing and the cooling rings R1, R2, R3. With the inventive bracket 1 and the uniform transfer of clamping force F onto the cooling rings R1, R2, R3, the layer of paste P is not forced out from underneath the cooling rings.

With only a single fastener 4, it is possible to reliably press three (or more) cooling rings R1, R2, R3 onto the bearing ring surface 30, so that the cooling rings R1, R2, R3 can effectively cool the bearing ring 30. Of course, the bracket design can equally be applied to hold one or two cooling rings in place on the bearing ring.

Figure 2:
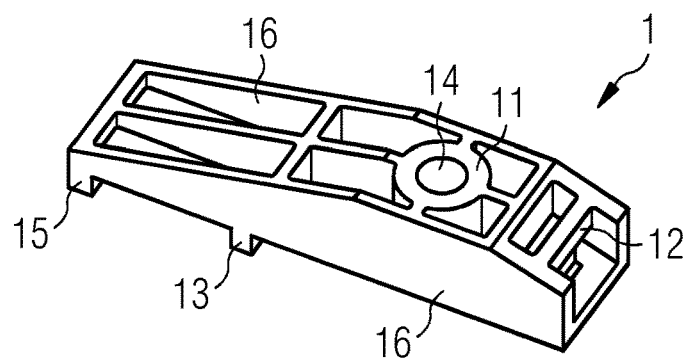
FIG. 2 shows a perspective view of the cooling ring bracket of FIG. 1.

FIG. 2 shows a perspective view of the cooling ring bracket 1 of FIG. 1 from above. The diagram shows how the bracket 1 might be constructed. Here, the bracket 1 is formed by injection moulding to comprise an arrangement of side faces 16 and intersecting upright faces, and a cylindrical through-opening 14 that will receive the fastener 4. The diagram also shows the upper surface 11 in the form of an annular face. To effectively transfer the clamping force F into the body of the bracket 1, this annular face is at least as wide as the flange 400 of the fastener head 4.

The diagram also shows an attachment strut 12 which can be used to attach another object to the bracket 1, for example a sensor cable can be secured to the bracket 1 by means of a cable tie.

Figure 3:
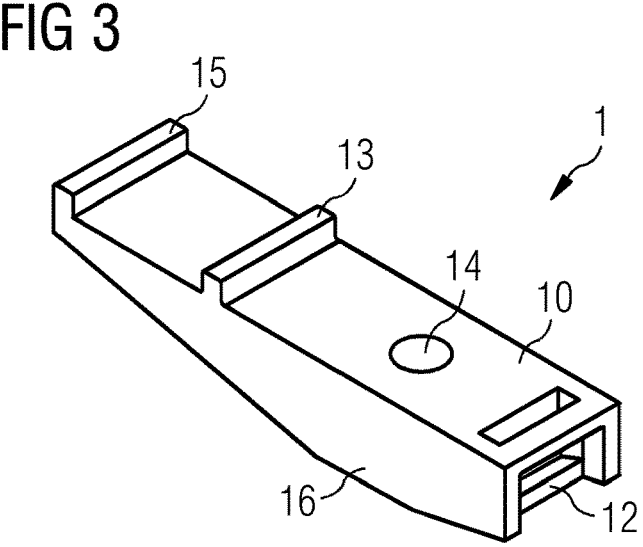
FIG. 3 shows a perspective view of the cooling ring bracket of FIGS. 1 and 2.

FIG. 3 shows, from below, a perspective view of the cooling ring bracket 1 of FIGS. 1 and 2. The diagram shows the flat lower surface 10 of the bracket 1, and two noses 13, 15 that will fit on either side of the outermost cooling ring R3. The diagram also indicates the through-hole 14 and the attachment strut 12.

Figure 4:
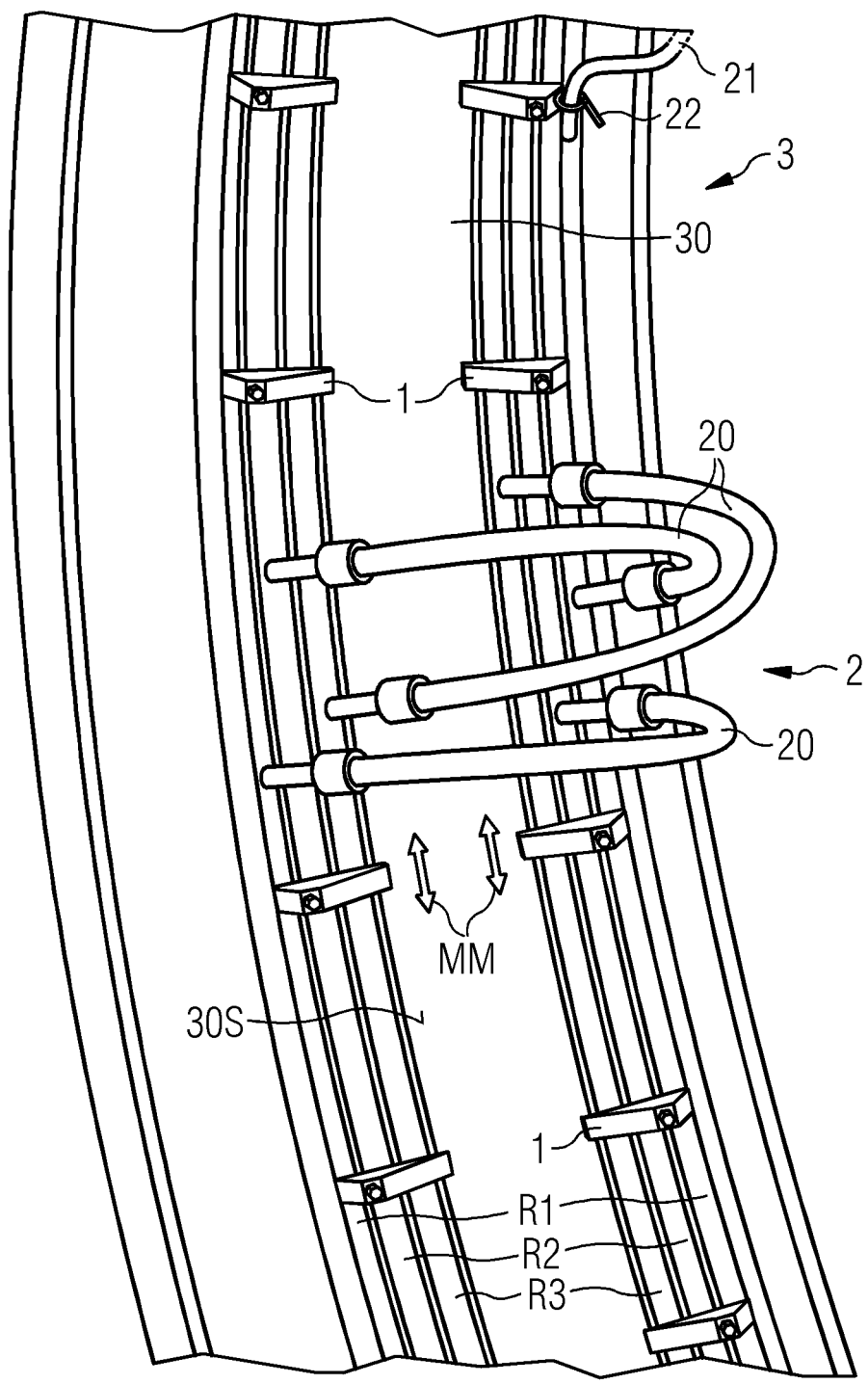
FIG. 4 shows a portion of a main bearing.

FIG. 4 shows a portion of a main bearing 3 that might be installed in a wind turbine, for example between the outer rotor and inner stator of a direct-drive generator. The diagram shows two sets of three cooling rings R1, R2, R2 arranged on an inner surface 30S of the inner (stationary) bearing ring 30. The cooling arrangement may be realized as two separate cooling circuits that are usually operated simultaneously, and so that one of the cooling systems can be switched off during curtailed operation of the wind turbine. To provide optimal cooling during curtailed operation, the cooling rings are interconnected in a suitable manner, for example the first cooling circuit includes two cooling rings of a first set and one cooling ring of the other set, and the second cooling circuit includes the remaining cooling rings.

The cooling rings R1, R2, R3 are pressed onto the bearing ring 30 by brackets 1 as described in FIGS. 1 to 3. The brackets 1 are arranged at intervals. For example, for a main bearing with a diameter of about 4.5 m, there may be 70 or more cooling ring brackets 1 evenly distributed about the inner circumference of the inner bearing ring 30. Because of the advantageous geometry of the inventive bracket 1, all three cooling rings R1, R2, R3 remain reliably pressed against the bearing ring 30, even when subject to temperature variations and vibrations, so that efficient cooling of the bearing 3 is ensured.

The diagram also shows a number of inlet and outlet hoses 20 attached to the cooling rings R1, R2, R3 so that a fluid coolant can be pumped through the cooling rings. Other components of the cooling arrangement 2 such as a pump, heat exchanger, control unit etc. are not shown here for the sake of clarity, but may be assumed to be part of the cooling arrangement 2. The inventive bracket 1 allows micro-movements MM of the cooling rings R1, R2, R3 during operation of the bearing, as indicated by the short double-pointed arrows. Such micro-movements can arise from thermal expansion/contraction, vibration of the bearings, etc. By permitting these micro-movements, the bracket 1 allows the cooling rings to move slightly in both directions, so that a cooling ring will be able to return to its original position. This is in contrast to the known assemblies, in which a cooling ring will move slightly in one direction but be prevented (because of a cold weld or a high friction coefficient) from returning to its original position, so that fasteners become loose, and the cooling hose attachments may be damaged.

The diagram also shows a sensor cable 21 secured to an attachment strut of a bracket 1 by means of a cable tie 22. The sensor can be a temperature sensor, a vibration sensor, or any other appropriate sensor used to monitor a condition in or near the bearing.

Figure 5:
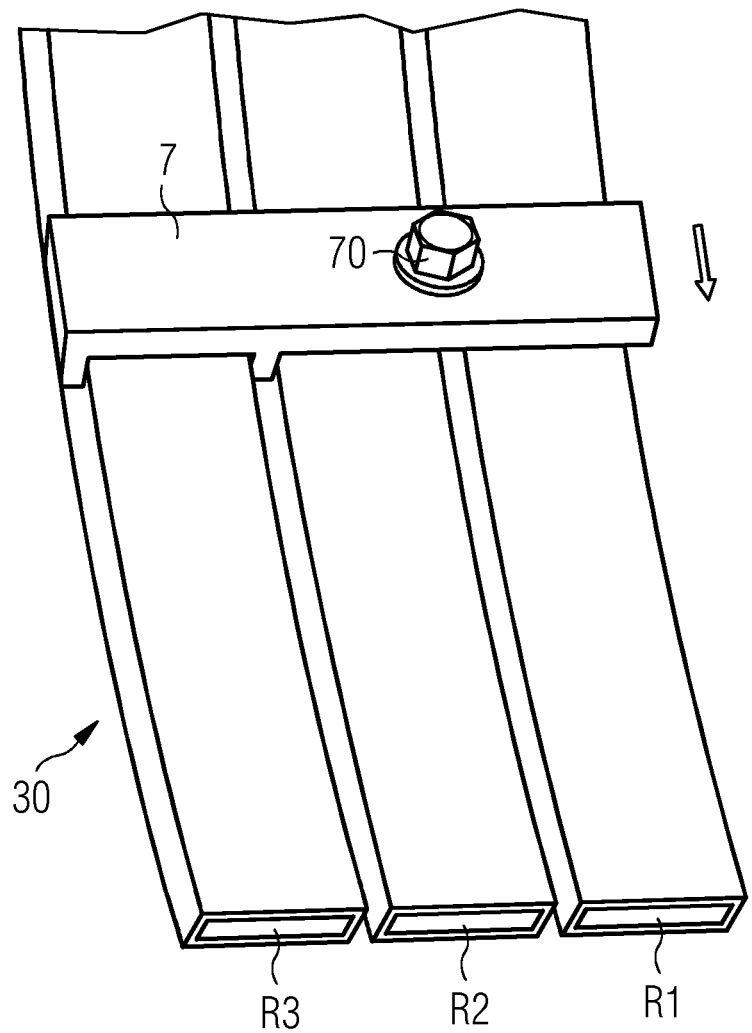
FIG. 5 shows a known bracket.
Figure 6:
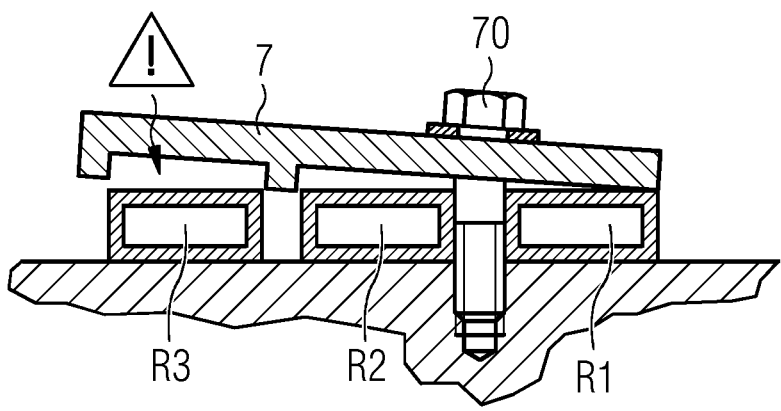
FIG. 6 illustrates a problem associated with the known bracket of FIG. 5.

FIG. 5 shows a known bracket 7 used to hold three cooling rings R1, R2, R3 in place against the inner bearing ring 30 of a main bearing 3. The known bracket 7 is a flat metal bracket 7 that is held in place by a fastener 70 that is screwed into the body of the bearing ring 30. The fastener 70 must be tightened to achieve a clamping force that is sufficiently great to also press the outer ring R3 onto the bearing ring 30. However, this clamping force may be so high that the thermal paste P is forced out from between the bearing ring and a cooling ring. A fragmented paste layer can significantly reduce the effectiveness of heat transfer from the bearing to the cooling rings. A disadvantage of this known bracket 7 is that friction between the bracket 7 and a cooling ring R1, R2, R3 can cause a cold weld to develop, so that the cooling ring R1, R2, R3 can only move in one direction relative to the bracket 7, as shown be the arrow. When the cooling ring R1, R2, R3 moves slightly because of vibrations in the bearing and/or because of thermal expansion/contraction, it can pull on the bracket 7, so that eventually the fastener 70 may become loose. The effect of the loosened fastener 70 is shown in FIG. 6. Here, the bracket 7 can no longer exert enough pressure on the outer cooling ring R3, which can detach from the bearing ring 30, thereby reducing the cooling performance. The bearing may eventually overheat and damage may ensue.

Figure 7:
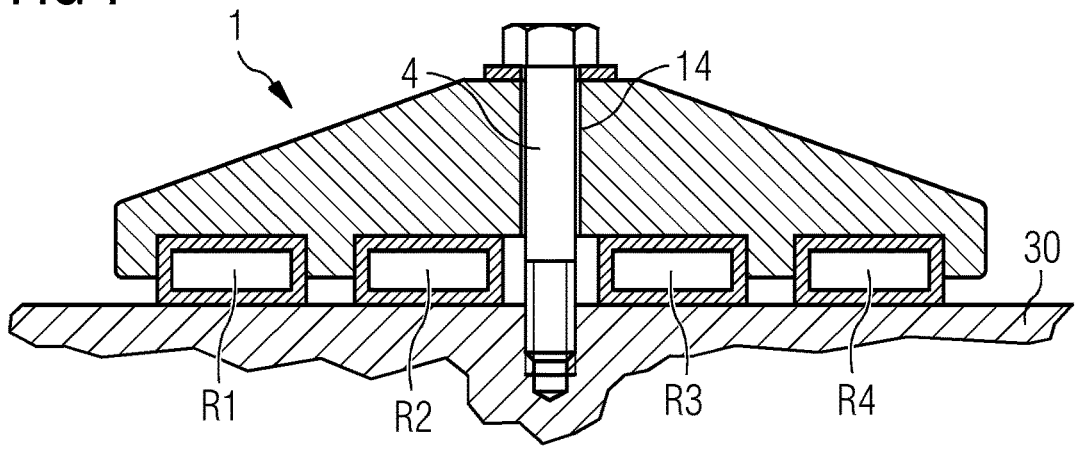
FIG. 7 shows another possible embodiments of the inventive bracket that is shaped to span four cooling rings.
Figure 8:
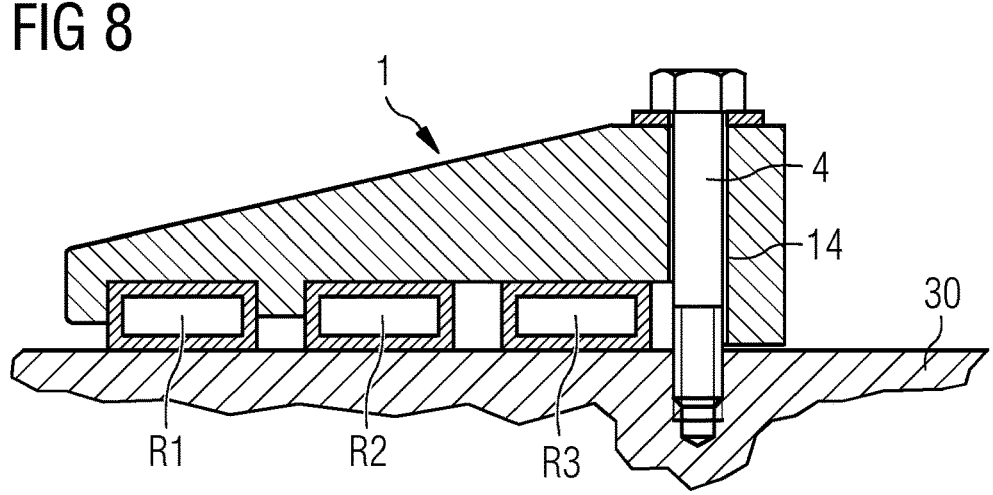
FIG. 8 shows another embodiment of the inventive bracket that is shaped so that the through-hole is arranged to one side of the bracket.
Figure 9:
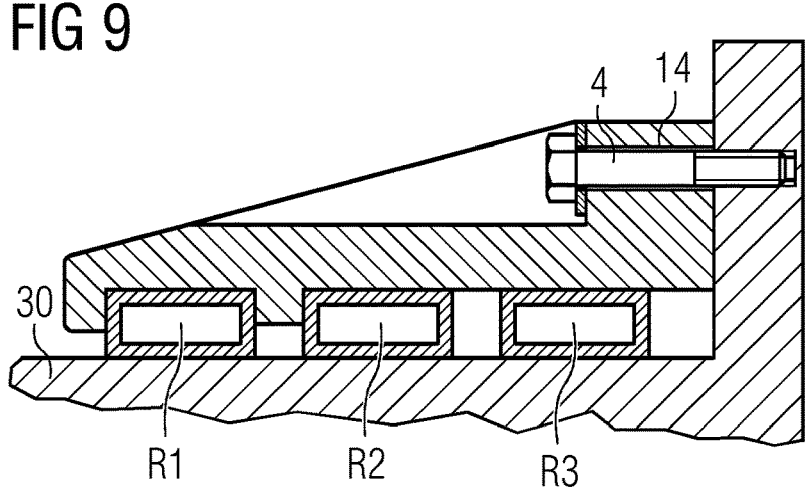
FIG. 9 shows another embodiment of the inventive bracket which is shaped to span several cooling rings R1, R2, R3, and the through-hole extends sideways through the bracket.

FIGS. 7-9 show other possible embodiments of the inventive bracket 1. In FIG. 7, the bracket 1 is shaped to span four cooling rings R1-R4, and the through-hole 14 is arranged in the centre of the bracket 1 so that the fastener 4 extends into the bearing ring 31 between rings R2, R3. In FIG. 8, the bracket 1 is shaped so that the through-hole 14 is arranged to one side of the bracket 1. In FIG. 9, the bracket 1 is shaped to span several cooling rings R1, R2, R3, and the through-hole 14 extends sideways through the bracket 1 so that the fastener 4 is screwed into a threaded bushing on a side wall or flange of the bearing.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bracket for securing a number of cooling rings arranged on a bearing ring, which bracket comprises:
   a lower surface configured to lie on the cooling rings, and
   a through-opening extending between an upper surface and the lower surface to accommodate a fastener for mounting the bracket to the bearing ring;
   wherein the bracket is made of a resilient elastic material, and
   wherein a body of the bracket has an upper level configured to be positioned over a gap between two adjacent cooling rings of the number of cooling rings and wherein the body of the bracket also has at least one inclined side face extending from the upper level toward the lower surface.

2. The bracket according to claim 1, made of polyoxymethylene.

3. The bracket according to claim 1, wherein a length of the through-opening is configured to exceed a height of at least one cooling ring of the number of cooling rings by at least 200%.

4. The bracket according to claim 1, wherein the bracket is configured to transfer at least one of at least 15%, or at least 30% of a force exerted by the fastener onto each cooling ring.

5. The bracket according to claim 1, configured to span at least three cooling rings.

6. The bracket according to claim 1, wherein the through-opening is configured such that the fastener can extend into a gap between adjacent cooling rings when the bracket is mounted to the bearing ring.

7. The bracket according to claim 1, comprising a nose configured to extend into a gap between adjacent cooling rings.

8. The bracket according to claim 1, comprising a nose configured to extend over an outer edge of an outer cooling ring.

9. The bracket according to claim 1, comprising an attachment configured to facilitate attachment of an object to the bracket.

10. A cooling arrangement for a bearing, comprising:
a number of cooling rings arranged in parallel; and
at least one bracket having a base level, an upper level, and at least one inclined side face, wherein the at least one bracket is configured to span multiple cooling rings of the number of cooling rings and is configured to be secured to a bearing ring by a fastener extending from the upper level of the bracket through a through-opening to the base level, wherein the material properties of the at least one bracket are chosen to permit movement of the spanned multiple cooling rings relative to the at least one bracket when the at least one bracket is mounted to the bearing ring and/or wherein the at least one bracket is made of a resilient elastic material.

11. The cooling arrangement according to claim 10, wherein the fastener is a metal screw comprising a flanged, a shank and a threaded portion, wherein the length of the shank is at least the length of the through-opening.

12. The cooling arrangement according to claim 11, wherein the flange is ridged to engage with the material of the bracket.

13. The cooling arrangement according to claim 10, wherein at least one of the cooling rings is configured as a metal conduit with a rectangular cross-section and a height in a region of 15 mm -30 mm.

14. The cooling arrangement according to claim 10, comprising at least one set of three cooling rings configured to be secured to the bearing ring by a plurality of brackets.

15. A bearing of a direct-drive wind turbine generator, comprising a cooling arrangement according to claim 10 to cool the bearing.

16. The cooling arrangement according to claim 10, wherein a length of the through-opening exceeds a height of at least one cooling ring of the number of cooling rings by at least 200%.

17. The cooling arrangement according to claim 10, wherein the at least one bracket is made of polyoxymethylene.

18. The cooling arrangement according to claim 10, wherein the upper level is positioned over a gap between two adjacent cooling rings of the number of cooling rings.

19. The cooling arrangement according to claim 10, wherein the at least one bracket is configured to span at least three cooling rings.

20. The cooling arrangement according to claim 10, wherein the through-opening is configured such that the fastener can extend into a gap between adjacent cooling rings when the at least one bracket is mounted to the bearing ring.

* * * * *